(12) United States Patent
Iwata et al.

(10) Patent No.: US 6,233,076 B1
(45) Date of Patent: *May 15, 2001

(54) OPTICAL COMMUNICATIONS SYSTEM

(75) Inventors: Hiroyuki Iwata, Yokohama; Shinichirou Harasawa, Kawasaki, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,934

(22) Filed: Sep. 5, 1997

(30) Foreign Application Priority Data

Sep. 17, 1996 (JP) .................................................. 8-282822
Aug. 4, 1997 (JP) .................................................. 9-208899

(51) Int. Cl.⁷ .................................................. H04J 14/02
(52) U.S. Cl. .................................................. 359/133; 359/110
(58) Field of Search .................................................. 359/110, 114, 359/124, 127, 133

(56) References Cited

U.S. PATENT DOCUMENTS

| | | | |
|---|---|---|---|
| 4,973,169 | * 11/1990 | Slonecker | 359/124 |
| 5,291,326 | * 3/1994 | Heidemann | 359/114 |
| 5,311,347 | 5/1994 | Kubo et al. | 359/176 |
| 5,390,185 | * 2/1995 | Hooijmans et al. | 359/124 |
| 5,396,360 | 3/1995 | Majima | 359/133 |
| 5,535,037 | * 7/1996 | Yoneyama | 359/110 |

FOREIGN PATENT DOCUMENTS

| | | |
|---|---|---|
| 4-107429 | 4/1992 | (JP) . |
| 4-118637 | 4/1992 | (JP) . |
| 4-293025 | 10/1992 | (JP) . |
| 5-226747 | 9/1993 | (JP) . |
| 5-327662 | 12/1993 | (JP) . |
| 7-199251 | 8/1995 | (JP) . |

OTHER PUBLICATIONS

"Proceedings of The 1996 Communications Society Conference of IEICE," Kanazawa University, Kanazawa, Japan; Sep. 18–21, 1996; including English translation.
"Proceedings of the 1997 IEICE (the Institute of Electronics, Information and Communication Engineers) General Conference," Mar. 24–27, 1997, Kansai University, Suita, Japan; including English translation.

* cited by examiner

Primary Examiner—Kinfe-Michael Negash
(74) Attorney, Agent, or Firm—Staas & Halsey LLP

(57) ABSTRACT

When a branching unit combines a first optical signal transmitted from a branch station with a second optical signal which is different in power level from the first optical signal and is transmitted from a terminal station A or B in an optical add-drop system, the S/N ratio of the lower power level of the two different power levels decreases, thereby deteriorating the system performance. Therefore, a dummy light is transmitted together with an optical signal to adjust the power level of the optical signal. Otherwise, an optical attenuator or an active optical signal level adjustment unit is provided for the branching unit so that both optical signals to be combined can be equal in level.

33 Claims, 13 Drawing Sheets

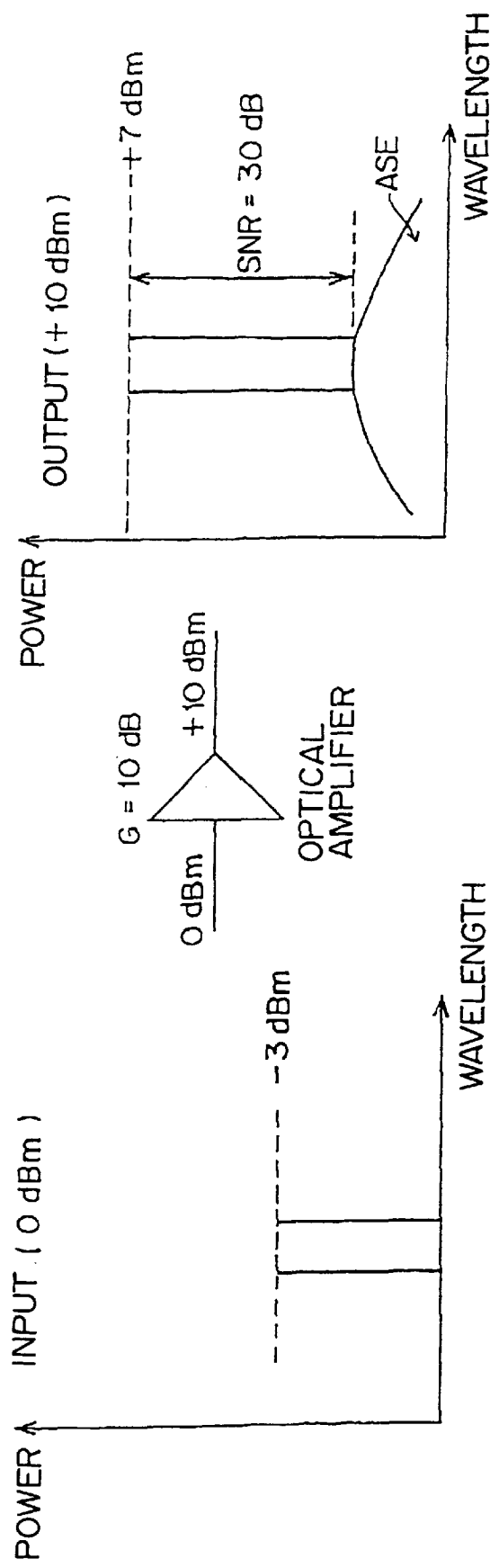

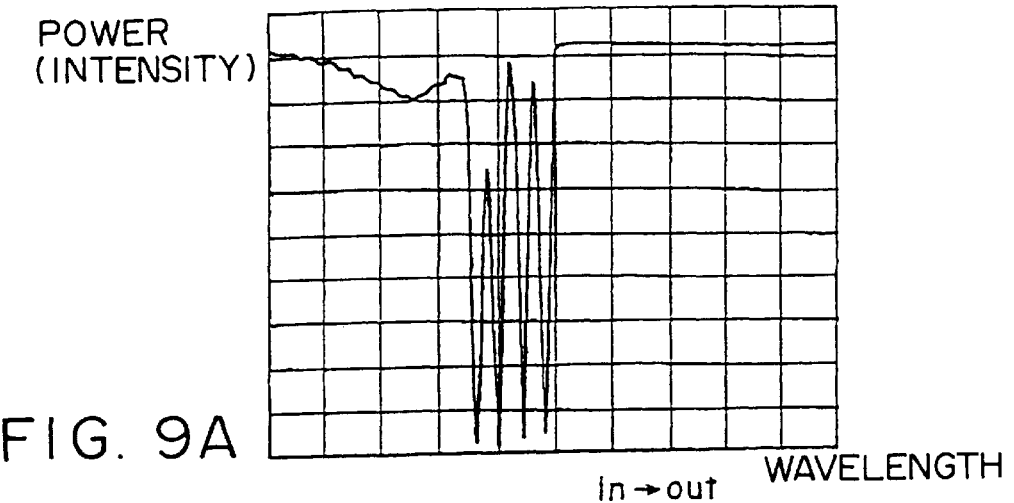
FIG. 9A    in → out    WAVELENGTH
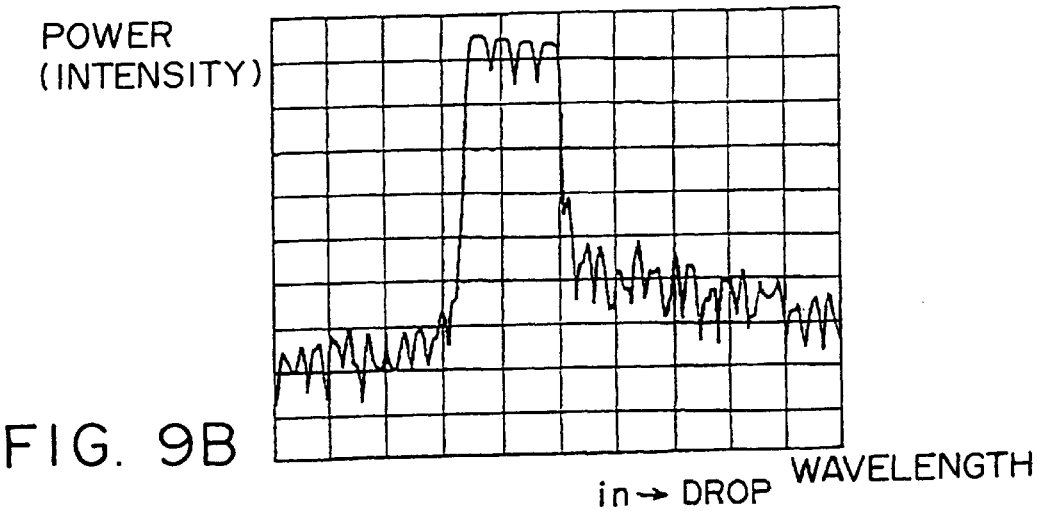
FIG. 9B    in → DROP    WAVELENGTH
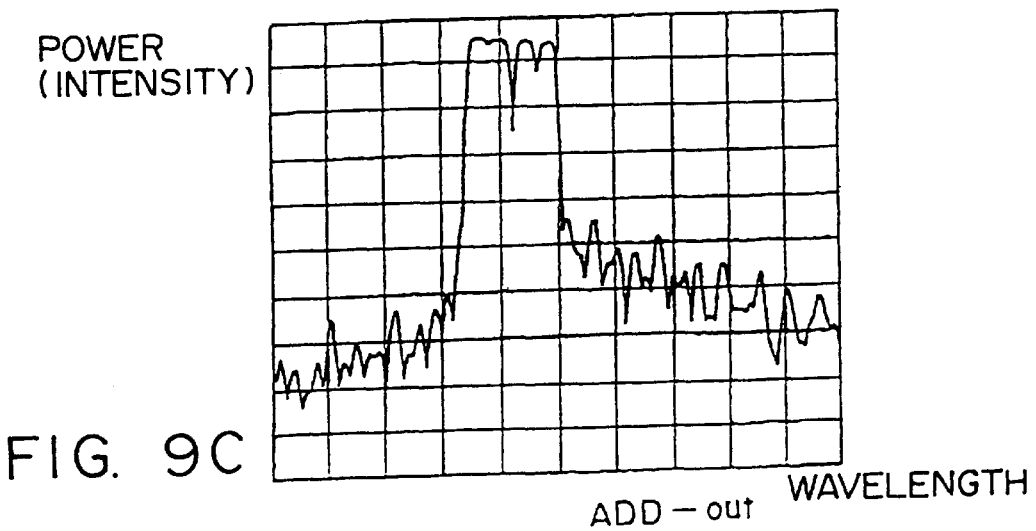
FIG. 9C    ADD → out    WAVELENGTH

OPTICAL COMMUNICATIONS SYSTEM

BACKGROUND OF THE INVENTION

1. Field of the Invention

The present invention relates to an optical communications system applicable to long-distance communications such as underseas cable communications, etc.

2. Description of the Related Art

Recently, optical communications systems have been widely developed to realize large-capacity and high-speed communications systems. Especially when a large volume of information is to be simultaneously transmitted, an optical wave-length multiplexing system is highly evaluated and is studied for practical use in the near future. In the optical wave-length multiplexing system, an optical signal which carries information and have a plurality of wavelengths is wavelength-multiplexed for transmission. An optical signal of each wave length corresponds to at least one communications channel. In the optical wavelength multiplexing system applicable to the long-distance communications such as underseas cable communications, an optical add-drop system is under development in which an optical signal having a specific wavelength or an optical signal along a specific channel among optical signals wavelength-multiplexed in the communications line is branched to transmit an optical signal along a channel branched to a terminal station, and the optical signal transmitted from the terminal station with the same wavelength as the branched channel is combined again to the optical signal transmitted through the original transmission line for transmission to the terminating station.

FIGS. 1A through 1F show the conventional optical add-drop system and the problem with the system.

FIG. 1A is a block diagram showing the entire configuration of the optical add-drop system. The basic configuration in the optical add-drop system has a terminal station A as a transmitting station for transmitting an optical-wavelength multiplexed optical signal, a terminal station C as a receiving station for receiving a signal from the terminal station A, a branching unit 1100 for branching or combining an optical signal of a specific wavelength in the optical signals from the terminal station A, and. a terminal station B for receiving the optical signal branched by the branching unit 1100, and transmitting new information with an optical signal having the same wavelength as the received optical signal. Normally in the underseas cable communications, the branching unit 1100 is mounted underseas to transmit optical signals to, for example, the terminal stations A, B, and C provided in different nations. Typically, the distance between the terminal stations A and C is approximately 3,000 km, and the branching unit 1100 is provided around the central point between these stations. Since the intensity of an optical signal is attenuated when the optical signal is transmitted for a long distance, the transmission lines between the terminal station A and the branching unit 1100, between the terminal station B and the branching unit 1100, and between the terminal station C and the branching unit 1100 have a plurality of optical amplifiers 1101, 1102, and 1103 respectively. FIG. 1A shows the optical amplifiers 1101, 1102, and 1103 apiece for respective transmission lines for a simple illustration, but there are actually much more optical amplifiers for each transmission line. Normally, each of the optical amplifiers 1101, 1102, and 1103 has an automatic output level control circuit (ALC circuit) to keep the output level of each of the optical amplifiers 1101, 1102, and 1103 constant so that the optical signal can be constantly amplified to a specific output level.

FIG. 1A shows the transmission line for one-way communications. Actually, the circuit is designed to establish two-way communications, that is, up-line and down-line communications.

FIGS. 1B through 1F show an optical signal and its problem in each transmission line.

FIG. 1B shows the optical signal at point A in FIG. 1A. In the case shown in FIG. 1B, optical signals having four different wavelengths are wavelength-multiplexed and transmitted from the terminal station A. The mound under each optical signal is called an amplified spontaneous emission (ASE) noise. It is produced when a noise superposed to an optical signal is amplified with the optical signal by an optical amplifier. The characteristics of the operations of the optical communications system depend on the S/N ratio of the optical signal to the ASE.

In the branching unit 1100, the optical signal having a wavelength $\lambda_1$ is branched and transmitted to the terminal station B, and an optical signal having the wavelength $\lambda_1$ is transmitted from the terminal station B to the terminal station C.

An optical signal having a wavelength other than wavelength $\lambda_1$ in the signal (FIG. 1B) transmitted from the terminal station A is not branched by the branching unit 1100, but is transmitted as is to the terminal station C. The terminal station B receives the optical signal having wavelength $\lambda_1$ and transmits an optical signal having the same wavelength $\lambda_1$. FIG. 1C shows the state at point B of the signal transmitted from the terminal station B and amplified by the optical amplifier 1102. The branching unit 1100 combines the optical signal having wavelength $\lambda_1$ transmitted from the terminal station B with the light having wavelength $\lambda_2$ through $\lambda_4$, and transmits the result to the terminal station C.

FIG. 1D shows the state at point C of the optical signal from the terminal station B which is combined by the branching unit 1100 and amplified by an optical amplifier 1103. FIGS. 1C and 1D show the case where the power level of an optical signal is equal to that of each other when the optical signal from the terminal station B is combined with the optical signal from the terminal station A. In this case, an optical signal having any wavelength indicates the same S/N ratio to the ASE noise as shown in FIG. 1D.

FIG. 1E also shows the state of the optical signal at point B. In this case, the power level of the optical signal from the terminal station B is high. When the power level of the optical signal from the terminal station B is high, the state of the optical signal at point C after being combined by the branching unit 1100 and being amplified by the optical amplifier 1103, becomes as shown in FIG. 1F. Therefore, although the S/N ratio of wavelength $\lambda_1$ is high, because the operation characteristics of the optical communications system are based on the lower S/N ratio, when the S/N ratios of the other wavelengths are low, the system is recognized as poor in operation characteristics.

FIGS. 2A, 2B, 3A, and 3B show the operation of the optical amplifier and the S/N ratio.

In this example, the two optical signals having different wavelengths are multiplexed, and an optical signal of a total of 0 dBm power is input to the optical amplifier. The optical amplifier includes an automatic output level control circuit having a gain of 10 dB and an optical output is limited to 10 dBm. The state of the optical signal at the input terminal is −3 dBm each for the power of the optical signals of two wavelengths, a total of 0 dBm as shown in FIG. 2A. FIG. 2B shows the output when such optical signals are input to the optical amplifier. That is, the optical signal of each wavelength is amplified, and the power of each optical signal is +7 dBm with a total power of the output light indicating +10 dBm. On the other hand, the ASE noise is also amplified, and the S/N ratio to the ASE noise of each optical signal is 30 dB. Therefore, the operation characteristic of the optical amplifier indicates the S/N ratio of 30 dB.

FIGS. 3A and 3B show the case where an input optical signal is multiplexed with an optical signal having a different power level. The characteristic of the optical amplifier is the same as that of the optical amplifier shown in FIGS. 2A and 2B. However, as shown in FIG. 3A, a total power of the optical signals having two different wavelengths is 0 dBm with the power level of one optical signal indicating −1.5 dBm while the other optical signal indicating 4.5 dBm. There is 3 dB difference between the power levels. If such optical signals are input, the output is obtained as shown in FIG. 3B. That is, the higher power level of the optical signal between the two input signals is +8.5 dBm while the lower power level of the optical signal is +5.5 dBm because the optical signal having each wavelength is amplified such that the total power level of the output signals can be the above described value, that is, the output of the optical amplifier is fixed to +10 dBm. At this time, the ASE noise is amplified and the S/N ratios are different between the wavelengths. That is, the S/N ratio of the wavelength indicating the higher power level is an acceptable value while the S/N ratio of the wavelength indicating the lower power level is relatively undesired. Since the operation characteristic of the optical amplifier is evaluated by the undesired S/N ratio, the performance of the optical amplifier is considered to be poor.

In the optical add-drop system as described above by referring to FIG. 1A, a lot of optical amplifiers are inserted between the terminal station and the branching unit. In the branching unit, an independently generated optical signal from the terminal station A is combined with an optical signal from the terminal station B, and amplified by the optical amplifier. The optical signals of respective wavelengths from the terminal stations A and B may not match in power when they are combined because of the transmission distance and the difference in output. Furthermore, the power level of the optical signal may not be controlled just as designed even if the system has been formed by carefully computing the output power and the attenuation of the optical signal in the designing step. In this case, there arises a difference in S/N ratio between the optical signal having a lower power level and the optical signal having a higher power level after the amplification through the optical amplifier as described by referring to FIGS. 2A, 2B, 3A, and 3B. The operation characteristic of the system is evaluated by the S/N ratio of the optical signal having the lower power level, that is, the undesired S/N ratio.

When the power level of the optical signal from a branch station is different from that of the optical signal from the transmitting station, the evaluation is made based on the lower S/N ratio indicating the transmission characteristic of the optical signal, thereby considering the system to be poor in performance.

SUMMARY OF THE INVENTION

The present invention aims at providing an optical communications system capable of compensating the difference between the power level of the optical signal from the transmitting station and the optical signal from the branch station, and maintaining a high system performance.

The optical communications system according to the present invention includes a transmitting station for transmitting a wavelength-multiplexed optical signal; a receiving station for receiving the optical signal; a branch station for receiving an optical signal having a specific wavelength in the wavelength-multiplexed optical signals and transmitting the optical signal on the specific wavelength; and a branching unit for branching the optical signal having the specific wavelength from the optical signal transmitted from the transmitting station, transmitting it to the branch station, and combining the optical signal transmitted from the branch station with the optical signal which has the wavelength other than the specific wavelength and has been transmitted from the branch station. The signals are combined with their power levels matching each other.

In an optical communications system including a transmitting station for transmitting a wavelength-multiplexed optical signal; a receiving station for receiving the optical signal; a branch station for receiving an optical signal having a specific wavelength in the wavelength-multiplexed optical signals and transmitting the optical signal on the specific wavelength; and a branching unit for branching the optical signal having the specific wavelength from the optical signal transmitted from the transmitting station, transmitting it to the branch station, combining the optical signal transmitted from the branch station with the optical signal from the transmitting station; and transmitting the result to the receiving station, the branching unit according to the present invention branches the optical signal having the specific wavelength from the optical signal transmitted from the transmitting station, transmits it to the branch station, and combines the optical signal transmitted from the branch station with the optical signal which has the wavelength other than the specific wavelength and has been transmitted from the branch station. The signals are combined with their power levels matching each other.

Otherwise, the terminal station according to another aspect of the present invention includes an optical transmission signal transmitting unit for generating an optical transmission signal modulated using the data to be transmitted; a dummy light generation unit for generating a dummy light different in wavelength from the optical transmission signal; a wavelength multiplexing unit for wavelength-multiplexing the dummy light and the optical transmission signal; and a level adjustment unit for adjusting the output level of the dummy light.

In the method of controlling the optical communications system according to another aspect of the present invention with a system including a first optical terminal station; a second terminal station, a third terminal station; an optical branching unit for connecting the first through third optical terminal station; and an optical amplifier for maintaining an output signal at a constant level between the optical branching unit and the second optical terminal station wherein the branching unit wavelength-multiplexes the optical transmission signals from the first and second terminal stations and transmits the result to the third terminal station, the second optical terminal station controls the optical transmission signal level of an output light from the optical amplifier by transmitting the dummy light different in wavelength from the optical transmission signal and adjusting the level of the dummy light.

Otherwise, in the terminal station in the optical communications system according to the present invention with a system including a first optical terminal station; a second terminal station, a third terminal station; an optical branching unit for connecting the first through third optical terminal station; and an optical amplifier for maintaining an output signal at a constant level between the optical branching unit and the second optical terminal station wherein the branching unit wavelength-multiplexes the optical transmission signals from the first and second terminal stations and transmits the result to the third terminal station, the second optical terminal station includes an optical transmission signal transmitting unit for generating an optical transmission signal modulated using data to be transmitted; a dummy light generation unit for generating a dummy light having a wavelength different in wavelength from the optical transmission signal; a wavelength multiplexing unit for wavelength-multiplexing the dummy light and the optical transmission signal; and a level adjustment unit for adjusting the output level of the dummy light.

In the optical communications system, the terminal station, or the branching unit according to the present invention, when the optical signals in those transmitted from the transmitting station for transmitting wavelength-multiplexed optical signals, but excluding those having a specific wavelength to be transmitted to the branch station are combined by the branching unit with the optical signals having the specific wavelength transmitted from the branch station, the combination can be performed with the power levels of both optical signals matching each other. Thus, the difference in power level between the optical signals after the combination prevents the S/N ratio of the signal at the lower power level from being lowered and the system performance from being deteriorated. That is, the present invention can realize an optical add-drop system capable of applying the system performance at a high level for a long time.

BRIEF DESCRIPTION OF THE DRAWINGS

FIGS. 2A and 2B are diagrams (1) for explaining the operation of the optical amplifier and the S/N ratio;

FIGS. 9A through 9C show the characteristic of the branching unit shown in FIG. 8;

DESCRIPTION OF THE PREFERRED EMBODIMENTS

Figure 4:
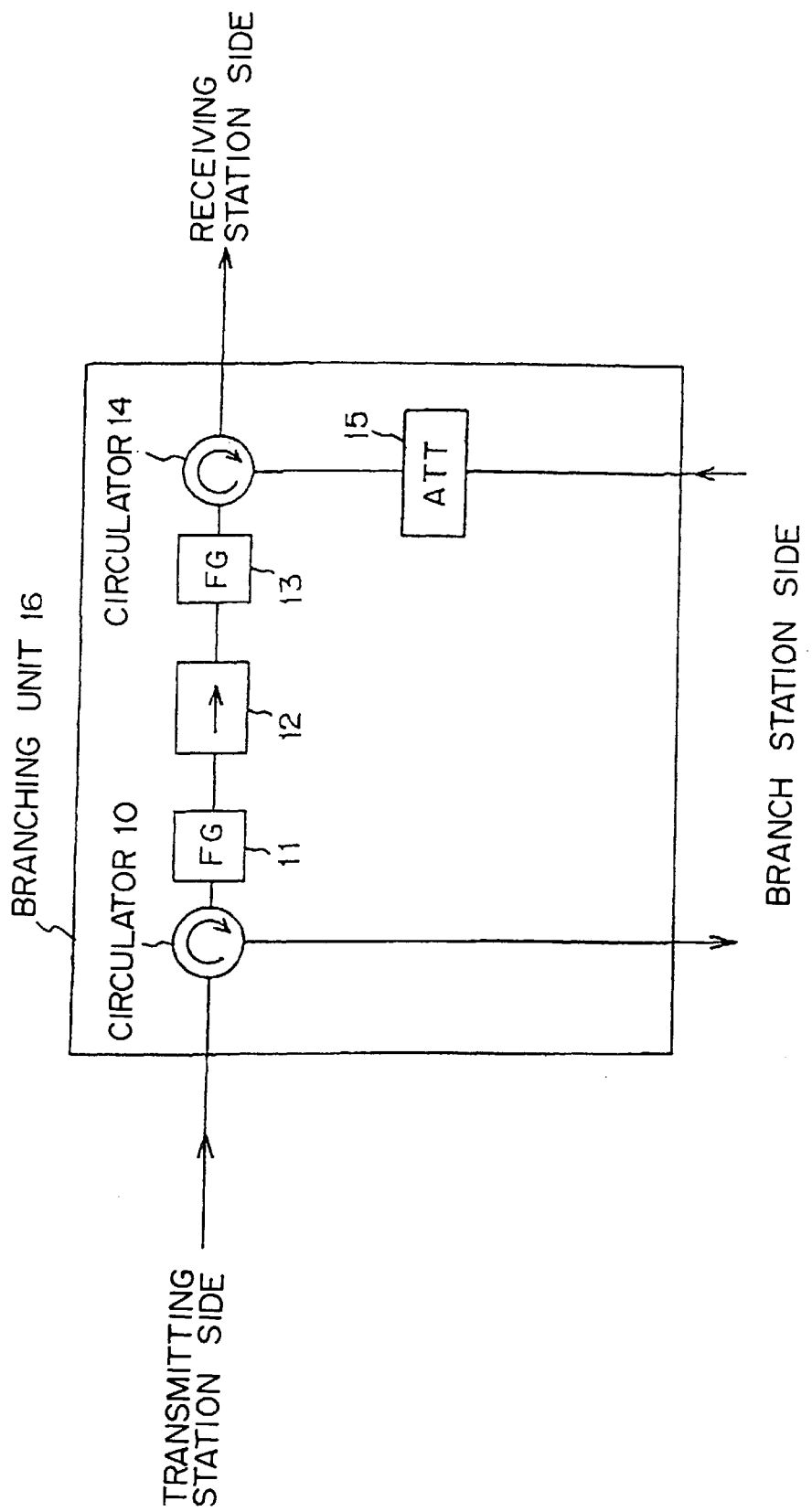
FIG. 4 shows the first embodiment of the present invention.

FIG. 4 shows the first embodiment according to the present invention.

FIG. 4 shows the configuration in which a branching unit 16 adjusts the power level of an optical signal from a branch station. Although only a down-line from the transmitting station to the receiving station is shown in FIG. 4, an up-line from the receiving station to the transmitting station is actually mounted.

The optical signal is transmitted from the transmitting station, wavelength-multiplexed, input to a circulator 10 and then to a fiber grating 11. In the fiber grating 11, only the optical signal having the wavelength to be transmitted to the branch station is reflected, and other signals pass straight. The optical signal reflected by the fiber grating 11 is input to the circulator 10 again and transmitted to the branch station. When the optical signal passing straight through the fiber grating 11 also passes through an isolator 12 and a fiber grating 13, enters a circulator 14, is combined with the optical signal transmitted from the branch station, and is then transmitted to the receiving station. When the optical signal transmitted from the branch station is input to the circulator 14, it is transmitted to the fiber grating 13. Since the wavelength of the optical signal transmitted from the branch station is equal to that reflected by the fiber grating 11, it is also reflected by the fiber grating 13, input to the circulator 14 again, and transmitted to the receiving side. The excess light which has not been reflected by the fiber grating 13 is prevented by the isolator 12 from being propagated to the transmitting station. When the optical signal transmitted from the transmitting station is combined with the optical signal transmitted from the branch station in the circulator 14, the S/N ratio is lowered when the signals are amplified by the optical amplifier if there is a difference between the power levels of the optical signals having respective wavelengths. In the case according to the present embodiment, an optical attenuator 15 is provided in the transmission line through which an optical signal is transmitted from the branch station. The optical attenuator 15 adjusts the power level of the optical signal from the branch station to make the optical signal transmitted from the transmitting station match in power level the optical signal transmitted from the branch station. Therefore, the system performance in the optical add-drop system can be maintained high.

Figure 5:
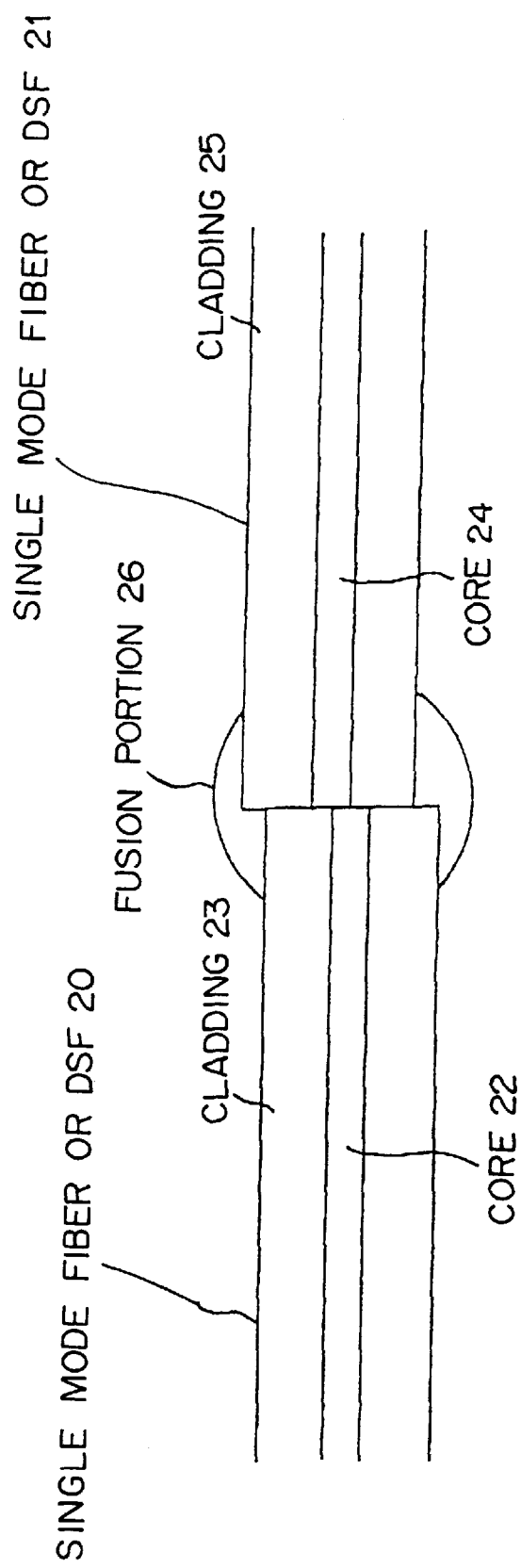
FIG. 5 shows an example of the optical attenuator according to the first embodiment.

FIG. 5 shows an example of the optical attenuator according to the first embodiment of the present invention.

The optical attenuator shown in FIG. 5 is obtained by fusing the single mode fiber or the dispersion shifted fibers (DSF) 20 and 21 with their optical axes shifted from each other. The single mode fiber or the DSF 20 or 21 comprises cores 22 and 24, and cladding 23 and 25 for protecting the cores 22 and 24. They are fused at a fusion portion 26. The core 22 and the core 24 are a little shifted from each other, and there is a loss of light when an optical signal passes this portion. Therefore, the optical signal after passing through this portion is lower in power level than the optical signal detected before the optical signal passes through the portion. Therefore, the power level of the optical signal transmitted from the branch station can be adjusted. Such connections of the optical fibers are referred to as an axis-shifted splice.

When the axis-shifted splice is used as a method of configuring the optical attenuator, the connection between the optical fibers is fixed and the attenuation of an optical signal is also fixed. Therefore, the attenuation of the optical signal is adjusted by the axis-shifted splice only once when the system is designed. However, since the optical attenuation can be maintained at a constant level for a long time, a reliable optical attenuator can be obtained in the case where the branching unit is provided underseas for use in underseas cable communications, and where the branching unit cannot be frequently maintained.

Because a unit which performs a splicing process usually contains equipment for detecting attenuation of the optical signal, the optical attenuation is normally adjusted by adjusting the amount of the shift of the optical axis of the optical fiber while confirming the optical attenuation when the optical fiber is spliced. Thus, an appropriate optical attenuation can be realized.

The configuration of the optical attenuator is not limited to the above described axis-shifted splice, but can be optionally determined within the range normally anticipated by one of ordinary skill of the art.

Figure 6:
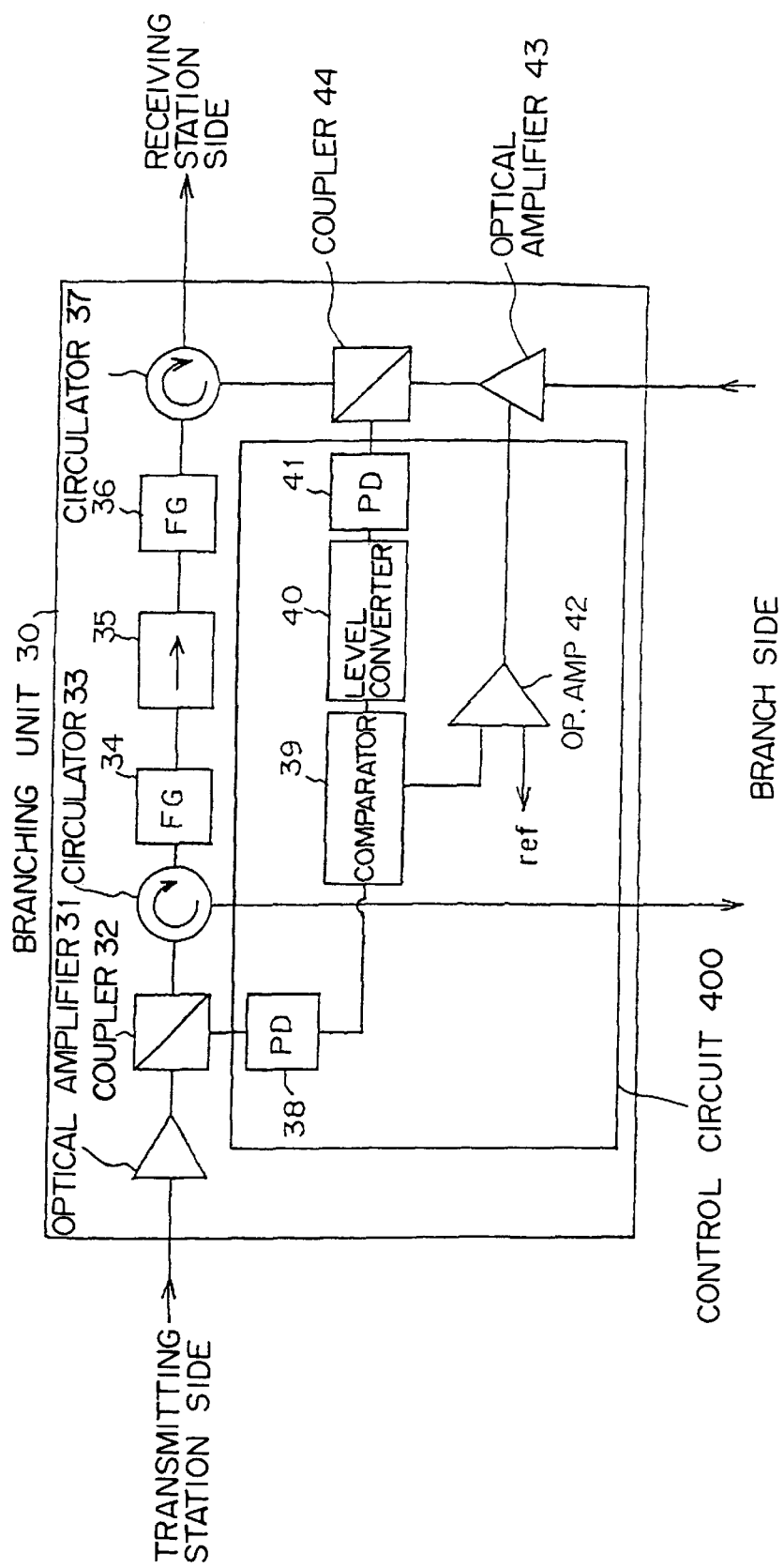
FIG. 6 shows the configuration according to the second embodiment of the present invention.

FIG. 6 shows the configuration of the second embodiment of the present invention.

Figure 1A:
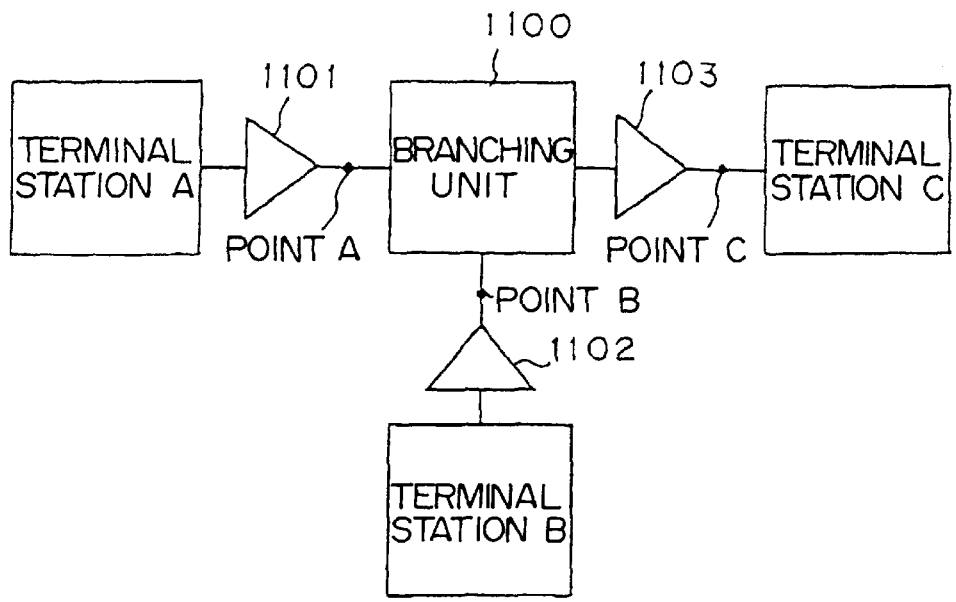
FIGS. 1A through 1F are diagrams for explaining the conventional add-drop system and its problems.
Figure 1B:
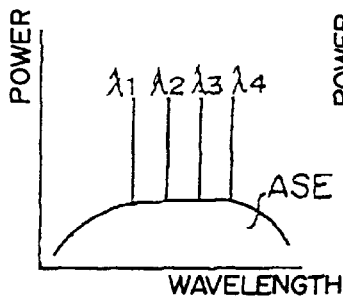
Figure 1C:
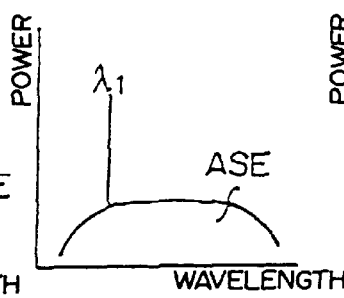
Figure 1E:
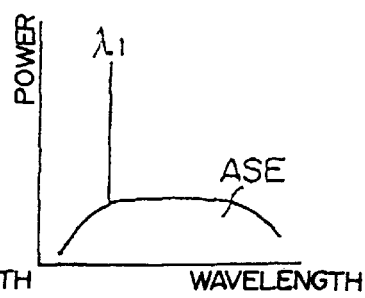
Figure 1D:
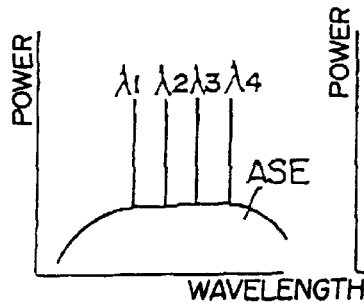
Figure 1F:
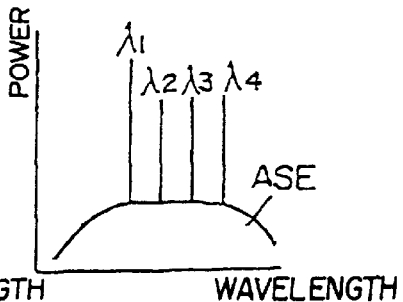
Figures 3A, 3B:
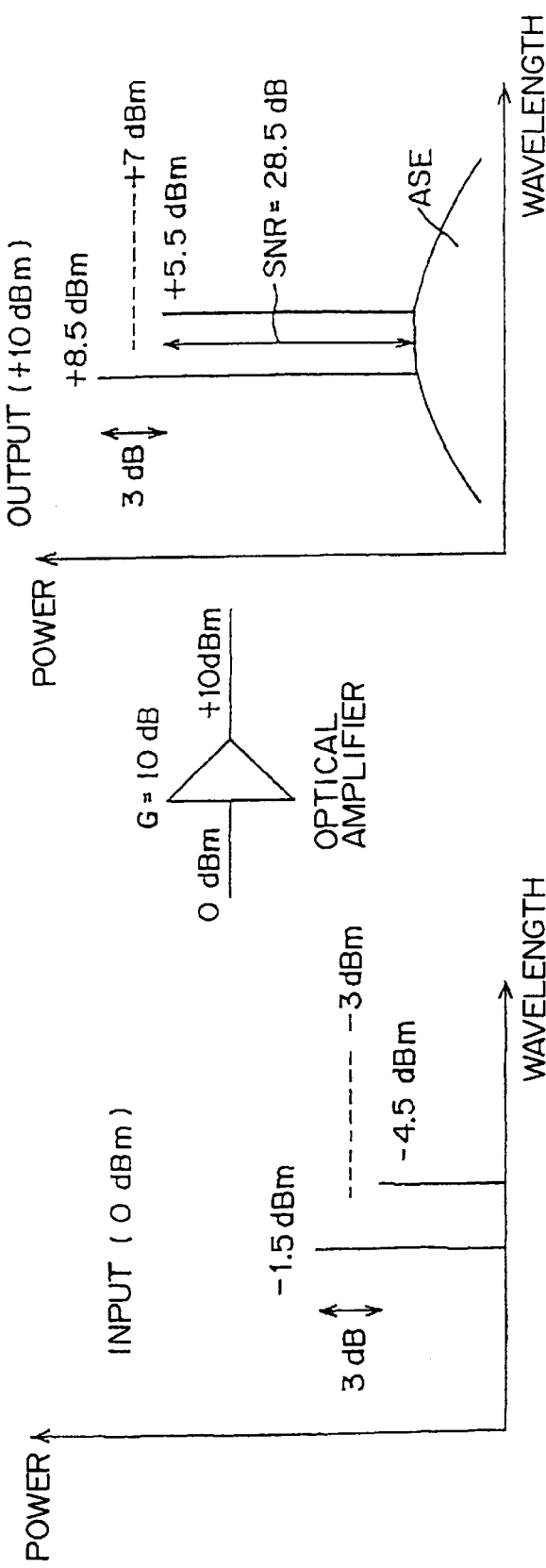
FIGS. 3A and 3B are diagrams (2) for explaining the operation of the optical amplifier and the S/N ratio.

Also in the present embodiment, a branching unit 30 is designed in a way that the power level of the optical signal transmitted from the branch station is adjusted to match the power level of the optical signal transmitted from the transmitting station. In FIG. 3, only the down-line from the transmitting station is indicated. (Actually, there can be an up-line.)

The optical signal transmitted from the transmitting station is amplified by an optical amplifier 31, and branched by a coupler 32. Since the branching process in this example is performed to monitor the power level of the optical signal from the transmitting station, the power of the most optical signals is designed not to branched, but to pass straight. From the optical signals which pass straight, the optical signals having the wavelengths to be transmitted in a circulator 33 and a fiber grating 34 to the branch station are retrieved, and the retrieved optical signals are transmitted to the branch station. The optical signals having the other wavelengths pass further straight through the isolator 35, and a fiber grating 36 and a circulator 37 combine the optical signal from the branch station and transmit the result to the receiving station.

The optical signal branched in coupler 32 is converted into an electric signal by a photodiode 38 in a control circuit 400, and input to a comparator 39. The optical signal transmitted from the branch station is input to an optical amplifier 43, amplified, and branched by a coupler 44. At this point, most optical signals pass straight, and are combined with the optical signals passing straight from the transmitting station by the circulator 37 and fiber grating 36, and the result is transmitted to the receiving side. The optical signal branched in the coupler 44 is converted into an electric signal by a photodiode 41 in the control circuit 400. The power level of the signal converted into an electric signal and received by a level converter 40 is adjusted and input to the comparator 39. The level converter 40 is provided for the following reason. That is, the optical signal received by the photodiode 38 is transmitted after the optical signals having, for example, eight different wavelengths are transmitted from the transmitting station and multiplexed. However, the optical signals received by the photodiode 41 are transmitted from the branch station, and contain the optical signals having, for example, four wavelengths in the eight different wavelengths used in transmitting the optical signals from the transmitting station. Therefore, the optical signals received by the photodiode 38 contain 8 optical signals while the optical signals received by the photodiode 41 contain only four optical signals. If the power levels of these optical signals are directly compared, those received by the photodiode 38 are naturally higher. However, it is necessary to make the power level of each wavelength of the optical signal transmitted from the branch station match the power level of each wavelength of the optical signal which has been transmitted from the transmitting station and has not been dropped (retrieved) to the branch station. Therefore, the power level of the 4-wave-multiplexed optical signal from the branch station is converted by the level converter 40 to match the power level of the 8-wave-multiplexed optical signal from the transmitting station. Then, the result is input to the comparator 39.

The comparator 39 compares the power Levels of the thus obtained electric signals and the comparison result is input to an operational amplifier 42. The comparison result is compared with the reference value (ref), and a control signal is issued to the optical amplifier 43 if there is a difference between the power level of the optical signal from the branch station and the power level of the optical signal from the transmitting station so that the power level of the optical signal from the branch station can be adjusted in a way that the power level of each wavelength of the optical signal passing straight from the transmitting station can be made to match the power level of each wavelength of the optical signal output from the optical amplifier 43.

Thus, when the optical signals are combined by the circulator 37 and the fiber grating 36, the power levels of both optical signals can be equal to each other. Therefore, the above described deterioration of the system performance caused by the optical amplifier while the optical signal is being transmitted to the receiving terminal can be successfully prevented.

The above described configuration of the branching unit is only an example, and there can be a number of variations which are implied by the technological concept of the present embodiment.

Figure 7:
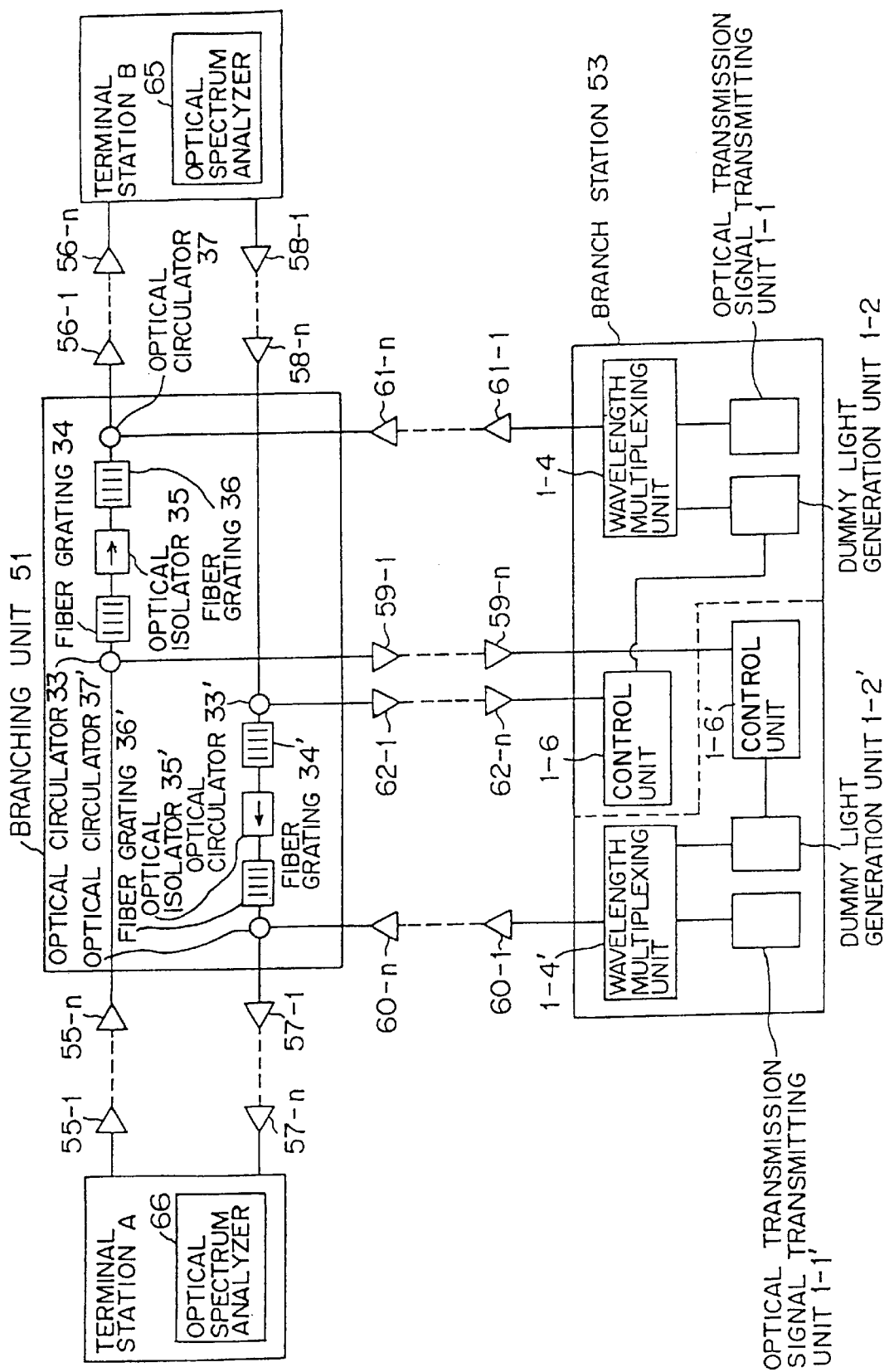
FIG. 7 shows the entire configuration according to the third embodiment of the present invention.

FIG. 7 shows the third embodiment of the present invention.

According to the first embodiment and the second embodiment, the difference in level between an optical transmission signal passing through the branching unit and an optical signal inserted from the branch station is adjusted in the branching unit. On the other hand, according to the third embodiment, the level of an optical signal is adjusted under the control on the terminal side before the signal is input to the branching unit.

Practically, a dummy light different in wavelength from an optical transmission signal is transmitted, and the level of the transmission signal is adjusted by changing the level of the dummy light in an optical terminal station.

That is, by raising the level of the dummy light, the level of the optical transmission signal is lowered when it passes through the optical amplifier. By lowering the level of the dummy light, the level of the optical transmission signal is raised when it passes through the optical amplifier.

FIG. 7 shows the configuration of the system comprising, at a branch station 53, an optical transmission signal transmitting unit 1-1; a dummy light generation unit 1-2 for generating a dummy light at an optical terminal station; a control unit 1-6 for adjusting the level of the dummy light; and a wavelength multiplexing unit 1-4 for combining the optical signals of different wavelengths. With this configuration, the level of the optical transmission signal is adjusted.

Figure 8:
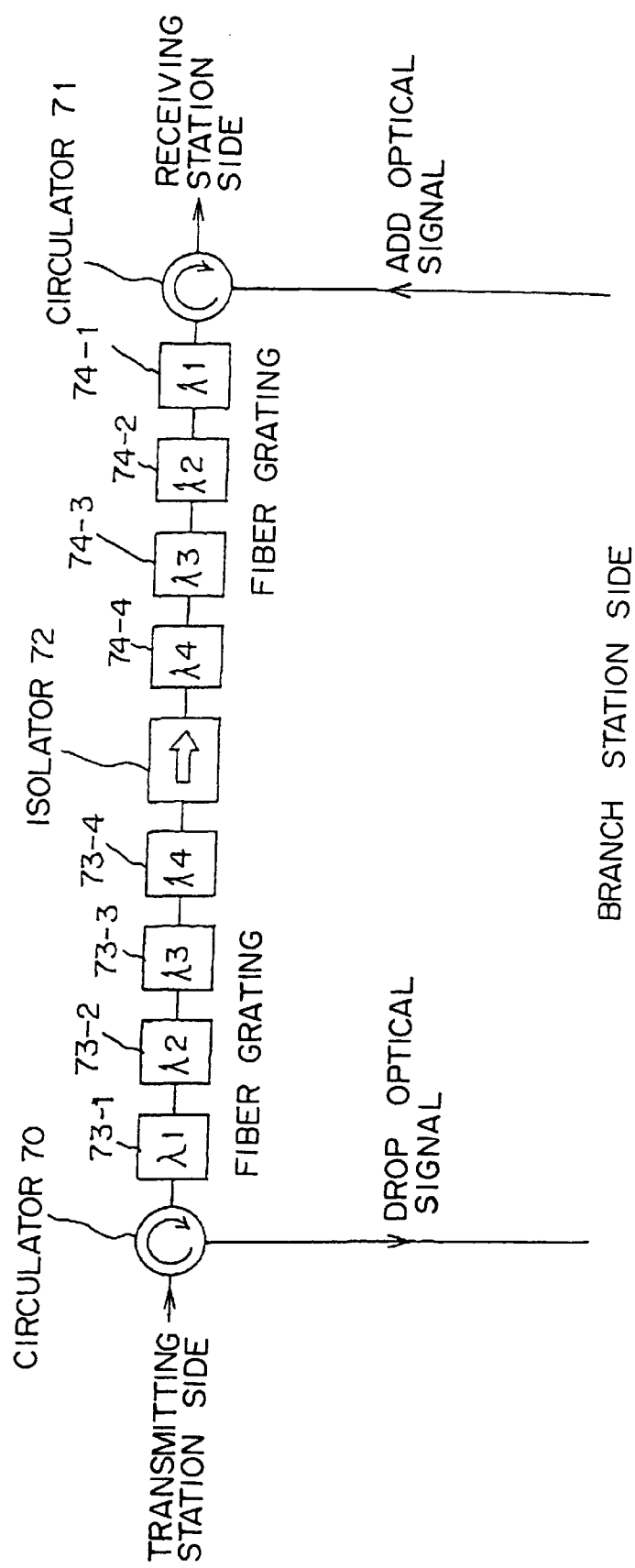
FIG. 8 shows the configuration for the add-drop of the optical signal in the branching unit according to the third embodiment of the present invention.

FIG. 8 shows the third embodiment of the present invention.

The configuration of the system is as shown in FIG. 7, comprising an branch station 53; an optical transmission signal transmitting unit 1-1; a dummy; light generation unit 1-2 for generating a dummy light; a control unit 1-6 for adjusting the level of the dummy light; and a wavelength multiplexing unit 1-4 for combining the optical signals of different wavelengths. With this configuration, the level of the optical transmission signal is adjusted.

A signal from the branch station 53 is amplified by the optical amplifier 61-1 when it is transmitted to the optical terminal station B through the optical amplifier 61-1. Thus, the optical signal level can be changed based on the level of a dummy light.

By raising the level of the dummy light, the level of the optical transmission signal is lowered when it passes through the optical amplifier 61-1. By lowering the level of the dummy light, the level of the optical transmission signal is raised when it passes through the optical amplifier 61-1.

That is, when the optical signals having wavelengths different from each other in power level are input to the optical amplifier, the output of the optical amplifier can be set constant as described in the description of the prior art. As a result, there arises a difference in power level after the amplification between the optical signals one of which indicates a high power level while the other indicates a low power level when input to the optical amplifier. Based on this, a dummy light capable of being variable in output level and different in wavelength from an optical signal, is transmitted together with the optical signal containing information data when the optical signal is transmitted from the branch station. Thus, the power level of the optical signal can be adjusted when the optical signal passes through optical amplifiers 60-1 through 60-n and 61-1 through 61-n.

FIG. 7 shows the entire configuration according to the third embodiment of the present invention.

FIG. 7 shows the configuration of the optical add-drop system in which terminal stations A and B are connected to each other using an up-line and a down-line through a branching unit 51. Also, a line is branched from the branching unit 51, and an up-line and a down-line are provided so that a branch station 53 can transmit and receive an optical signal. The transmission lines for connection of the terminal stations A, B, the branch station 53, and the branching unit 51 are provided with optical amplifiers 55-1 through 55-n, 56-1 through 56-n, 57-1 through 57-n, 58-1 through 58-n, 59-1 through 59-n, 60-1 through 60-n, 61-1 through 61-n, and 62-1 through 62-n, each of which has an ALC circuit, thereby amplifying the optical signal when the optical signal is transmitted over a long distance. The branching unit 51 has an up-line and a down-line. The up-line comprises an optical circulator 33 for inputting an optical transmission signal from the optical terminal station A to a fiber grating 34 and transmitting an optical transmission signal having a specific wavelength from the fiber grating 34 to a branch station 53; an optical isolator 35 for passing a light which has passed through the fiber grating 34; and an optical circulator 37 for inputting the optical signal from the branch station 53 to the fiber grating 36 and outputting a light reflected from the optical isolator 35 and the fiber grating 36 to the optical terminal station B side. The down-line comprises an optical circulator 33' for inputting an optical transmission signal from the optical terminal station B to a fiber grating 34' and transmitting an optical transmission signal having a specific wavelength from the fiber grating 34' to a branch station 53'; an optical isolator 35' for passing a light which has passed through the fiber grating 34'; and an optical circulator 37' for inputting the optical signal from the branch station 53' to the fiber grating 36' and outputting a light reflected from the optical isolator 35' and the fiber grating 36' to the optical terminal station B side.

The branch station 53 comprises a control unit 1-6 for receiving an optical transmission signal from the down-line; the optical transmission signal transmitting unit 1-1 for transmitting an optical, transmission signal; the dummy light generation unit 1-2 for changing the level of a dummy light upon receipt of the signal from the control unit 1-6; the wavelength multiplexing unit 1-4 for wavelength-multiplexing the output from the dummy light generation unit 1-2 and the optical transmission signal transmitting unit 1-1; a control unit 1-6' for receiving an optical transmission signal from the up-line; the optical transmission signal transmitting unit 1-1' for transmitting an optical transmission signal; the dummy light generation unit 1-2' for changing the level of a dummy light upon receipt of the signal from the control unit 1-6'; and the wavelength multiplexing unit 1-4' for wavelength-multiplexing the outputs from the dummy light generation unit 1-2' and the optical transmission signal transmitting unit 1-1'.

The adjustment between the power level of the optical signal from the branch station 53 and the power level of the optical signal from the terminal station A or B is made using dummy light generation units 1-2 and 1-2' provided in the branch station 53, optical spectrum analyzers 65 and 66 provided in the terminal stations A and B. The dummy light generated by the dummy light generation units 1-2 and 1-2' should be different in wavelength from the optical signal.

That is, when a dummy light is multiplexed and transmitted with the optical signal transmitted from the branch station 53, the output of the optical signal can be adjusted depending on the power level of the dummy light when they pass through the optical amplifier. For example, when the power level of the optical signal is higher than that of the dummy light, the output of the optical signal is larger than that of the dummy light after it is amplified by the optical amplifier. On the other hand, when the power level of the dummy light is higher than that of the optical signal, the output of the dummy light is larger than that of the optical signal after it is amplified by the optical amplifier, and the optical signal indicates a lower power level. Since the output of the optical signal remains constant, the sum of the output power of the dummy light and the output power of the optical signal should be constant. Therefore, changing the power level of the dummy light also changes the power level of the optical signal output from the optical amplifier.

The terminal stations A and B for receiving an optical signal are provided with the optical spectrum analyzers 65 and 66 for detecting the power levels of the signals having respective wavelengths in the received optical signal. It is determined whether or not there is a difference in power level by detecting the power level of each wavelength of the optical signal transmitted from the branch station 53 and the optical signal directly transmitted from the terminal station A or B. The result is transmitted to the branch station 53 with an optical signal. If the control units 1-6 of the branch station 53 that the optical signal transmitted by the branch station 53 is different in power level from the optical signal directly transmitted from the terminal station A or B, then the power level of the dummy light of the dummy light generation units 1-2 and 1-2' is adjusted so that the power level of the optical signal transmitted from the branch station 53 and output from the optical amplifier can be adjusted. Thus, the power level of the optical signal having each wavelength is constantly monitored by the receiving terminal station, and the power level of the dummy light is adjusted by the branch station 53 so that power level of the optical signal transmitted from the branch station 53 and the power level of the optical signal directly transmitted from the terminal station A or B can be approximately equal to each other when they are combined by the branching unit 51. Therefore, a high system performance can be maintained without deteriorating the operation characteristics as a system only because the optical signal having optically-multiplexed wavelengths indicates a low power level and then a deteriorated S/N ratio.

FIG. 8 shows the configuration for the add-drop of the optical signal in the branching unit according to the third embodiment of the present invention.

In FIG. 8, the units in the up-line are omitted. The branching unit according to the third embodiment has only the function of performing the add-drop of the optical signal. That is, the optical signal transmitted from the transmitting station and wavelength-multiplexed passes through a circulator 70 and input to fiber gratings 73-1 through 73-4. Each of the fiber gratings 73-1 through 73-4 functions to reflect the optical signal having unique wavelength. That is, the fiber gratings 73-1, 73-2, 73-3, and 73-4 selectively reflect the optical signals having the wavelength $\lambda_1$, $\lambda_2$, and $\lambda_4$ respectively from the optical signal transmitted from the transmitting station, and input the respective optical signals to the circulator 70 again. The optical signal reflected by the fiber gratings 73-1 through 73-4 enters the circulator 70 again, takes a different path, and is transmitted to the branch station as a drop optical signal. The optical signal not reflected by the fiber gratings 73-1 through 73-4 passes through an isolator 72, and fiber gratings 74-1 through 74-4, enters a circulator 71, is combined with the add optical signal transmitted from the branch station, and is transmitted to the receiving station.

The add optical signal and a dummy light transmitted from the branch station are input to the circulator 71, and are transmitted to the fiber gratings 74-1 through 74-4. As described above, the optical signals having wavelengths $\lambda_1$ through $\lambda_4$ are reflected, input to the circulator 71 again, and transmitted to the receiving station. At this time, the dummy light transmitted together with the optical signal as an add signal is not reflected by the fiber gratings 74-1 through 74-4 nor passes through the isolator 72. Thus, most of the signals are dispersed. With this configuration, the dummy light is not transmitted to the receiving station side.

FIGS. 9A through 9C show the characteristics of the branching unit shown in FIG. 8.

FIG. 9A shows the passage characteristics from the transmitting station to the receiving station. The incident light from the transmitting station is white light, and FIG. 9A indicates the transmission characteristic around the isolator 72 (FIG. 8). FIG. 9A indicates that the optical transmission intensity is lowered around four central wavelengths. It implies that the fiber gratings 73-1 through 73-4 reflect the light having these wavelengths, and the light is not output to the isolator 72. The wavelength other than a specific wavelength keeps unchanged in intensity. Therefore, with the configuration shown in FIG. 8, only the optical signal having a specific wavelength can be selectively prevented from passing.

FIG. 9B shows the characteristic of the drop of the optical signal from the transmitting station to the branch station. The light from the transmitting station is white light. FIG. 9B indicates that the light having the wavelength of low transmittance shown in FIG. 9A is retrieved on the contrary, and is transmitted to the branch station. The light having four different wavelengths is reflected by fiber gratings 73-1 through 73-4 shown in FIG. 8, and is transmitted to the branch station by the circulator 70.

FIG. 9C shows the transmission characteristics of the optical signal from the branch station to the receiving station. In this case, no lights are input from the transmitting station, and a white light is input from the branch station to check what type of wavelength is detected. In this case, the light input from the branch station is transmitted by the circulator 71 to the fiber gratings 74-1 through 74-4, and the light having the same wavelength as the case shown in FIG. 9B is reflected. Then, the light is input to the circulator 71 again, and output to the receiving station. As shown in FIG. 9C, the light having four different wavelengths is output, and the other lights are output only as low-level noises.

Figure 10A:
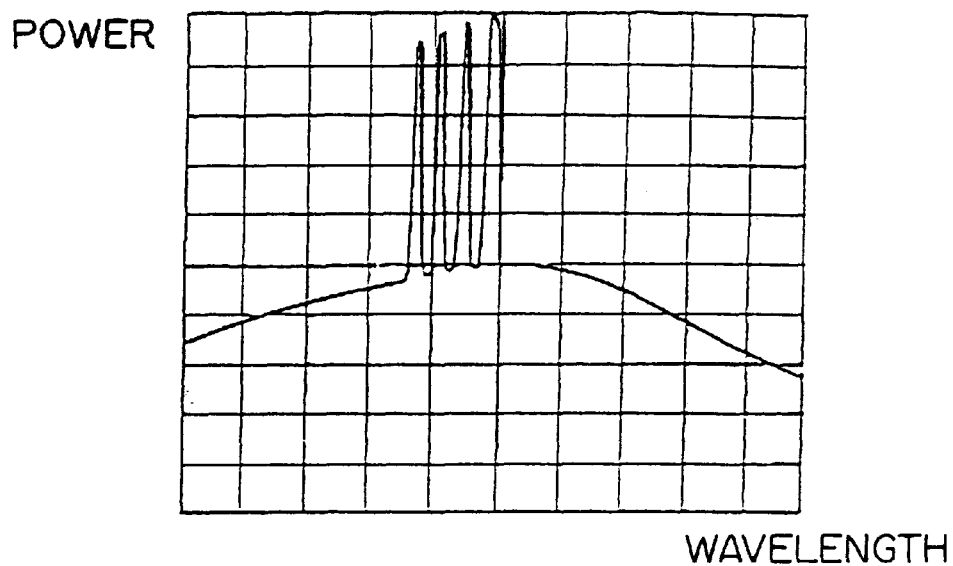
FIGS. 10A and 10B show the state of the add optical signal input to the branching unit in which the add optical signal is combined and the output light from the branching unit to the receiving station.
Figure 10B:
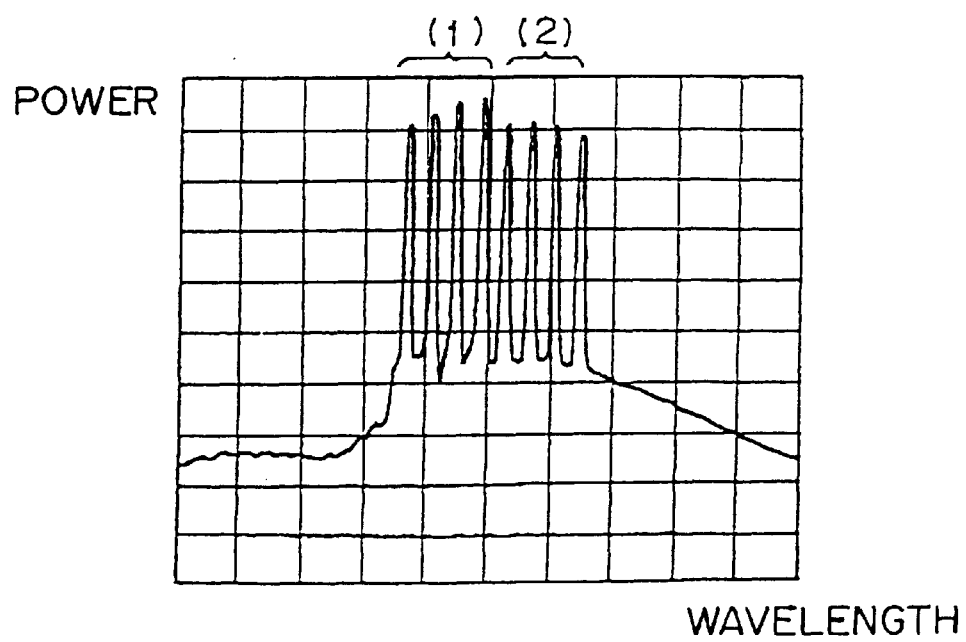

FIGS. 10A and 10B show the add optical signal input to the branching unit, and show the state of the output light from the branching unit, in which the add optical signal is combined, to the receiving station.

As shows FIG. 10A, it is assumed that a 4-wave multiplexed signal is transmitted from the branch station. If the signal is combined with the optical signal from the transmitting station without control as in the conventional technology, the combination results as shown in FIG. 10B. In this example, an 8-wave multiplexed signal is transmitted from the transmitting station, and it is assumed that the optical signal (1) having 4 shorter wavelengths shown by FIG. 10A is add-dropped by the branching unit.

If the optical signal from the branch station as shown in FIG. 10A is combined with the optical signal (2) from the transmitting station without any control, there arises a difference in power level between the optical signal (2) passing from the transmitting station and the optical signal (1) from the branch station as shown in FIG. 10B because the power level of the optical signal from the branch station is different from the power level of the optical signal from the transmitting station. In the case shown in FIG. 10B, the power level of the optical signal from the branch station is higher. That is, the optical signal shown by (1) is an optical signal from the branch station whereas the optical signal shown by (2) is an optical signal passing in the branching unit toward the receiving station. In FIGS. 10A and 10B, the mound-shaped portion indicates the ASE noise.

Figure 11A:
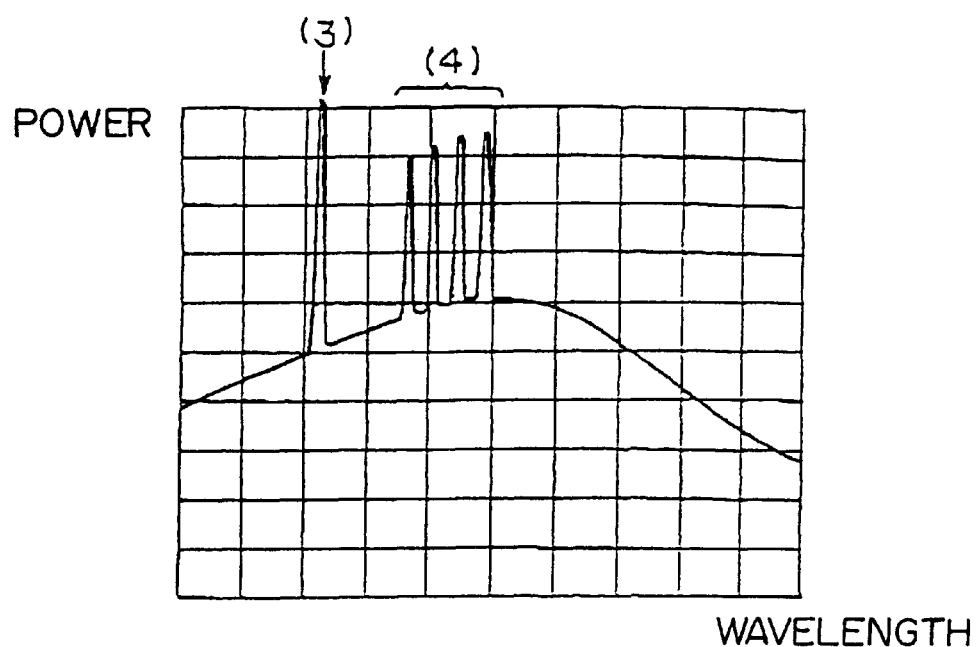
FIGS. 11A and 11B show the case where a dummy light is used as a control means according to the third embodiment of the present invention.
Figure 11B:
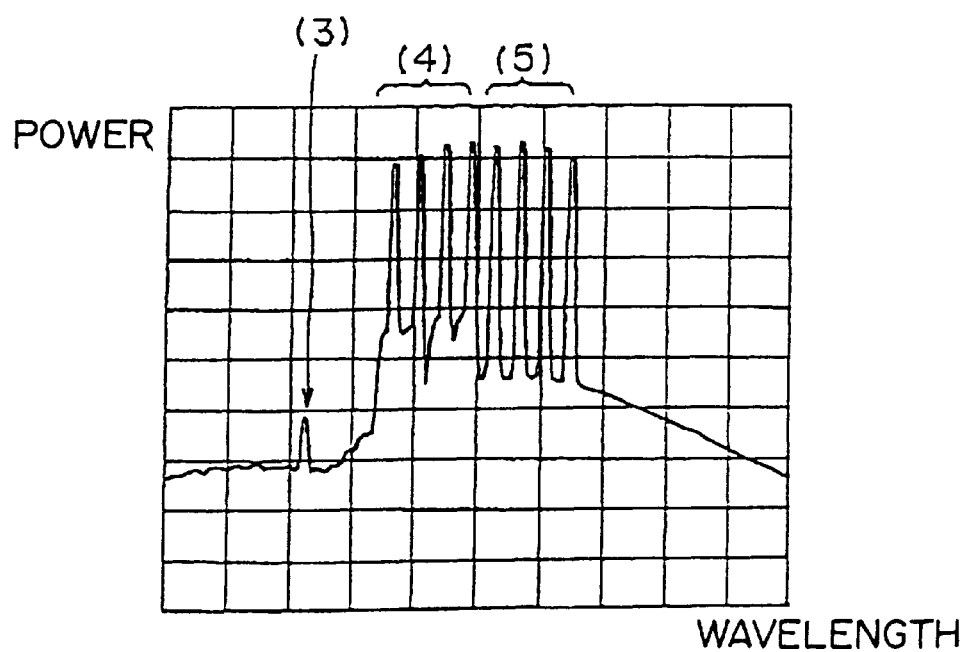

FIGS. 11A and 11B show the case where a dummy light is used as a control means according to the third embodiment of the present invention.

FIG. 11A indicates an optical signal containing a dummy light transmitted from the branch station to the branching unit. (4) indicates an optical signal containing information. (3) indicates a dummy light. As clearly recognized by comparing FIG. 11A with FIG. 10A, if the power level of the dummy light (3) is higher, then the power level of the optical signal (4) containing information becomes relatively low. In the case shown in FIG. 10B, the optical signal at a higher power level from the branch station is combined. Therefore, a difference in power level occurs between the optical signal from the branch station and the optical signal from the transmitting station directly to the receiving station. However, the power level of the optical signal (4) containing the information from the branch station can be lowered using the dummy light (3) as shown in FIG. 11A. Therefore, the difference in level can be reduced almost down to zero between the optical signal (5) output from the transmitting station to the receiving side in the branching unit and the optical signal (4) transmitted from the branch station as shown in FIG. 11B. The optical signal corresponding to (3) shown in FIG. 11B is the dummy light which has not been completely dispersed in the branching unit and has been output to the receiving station.

In the above described example, the power level of the optical signal containing the information transmitted from the branch station is relatively higher. If its power level is lower, the optical signal (4) containing the information can be relatively higher by lowering the power level of the dummy light. Therefore, the power level of the optical signal (5) from the transmitting station can be made to match the power level of the optical signal (4) from the branch station by adjusting the output of the dummy light in the branch station depending on the situation, thereby maintaining the high system performance.

The above described technology can be applied to the optical wavelength multiplexing communications indicating a higher multiplicity other than the 8-wave transmission, or to the optical wavelength multiplexing communications indicating a lower multiplicity. The wavelength of the dummy light does not have to be necessarily shorter, but can be any type as long as it is in the range of the band used to amplify an optical signal in the optical amplifier.

Figure 12:
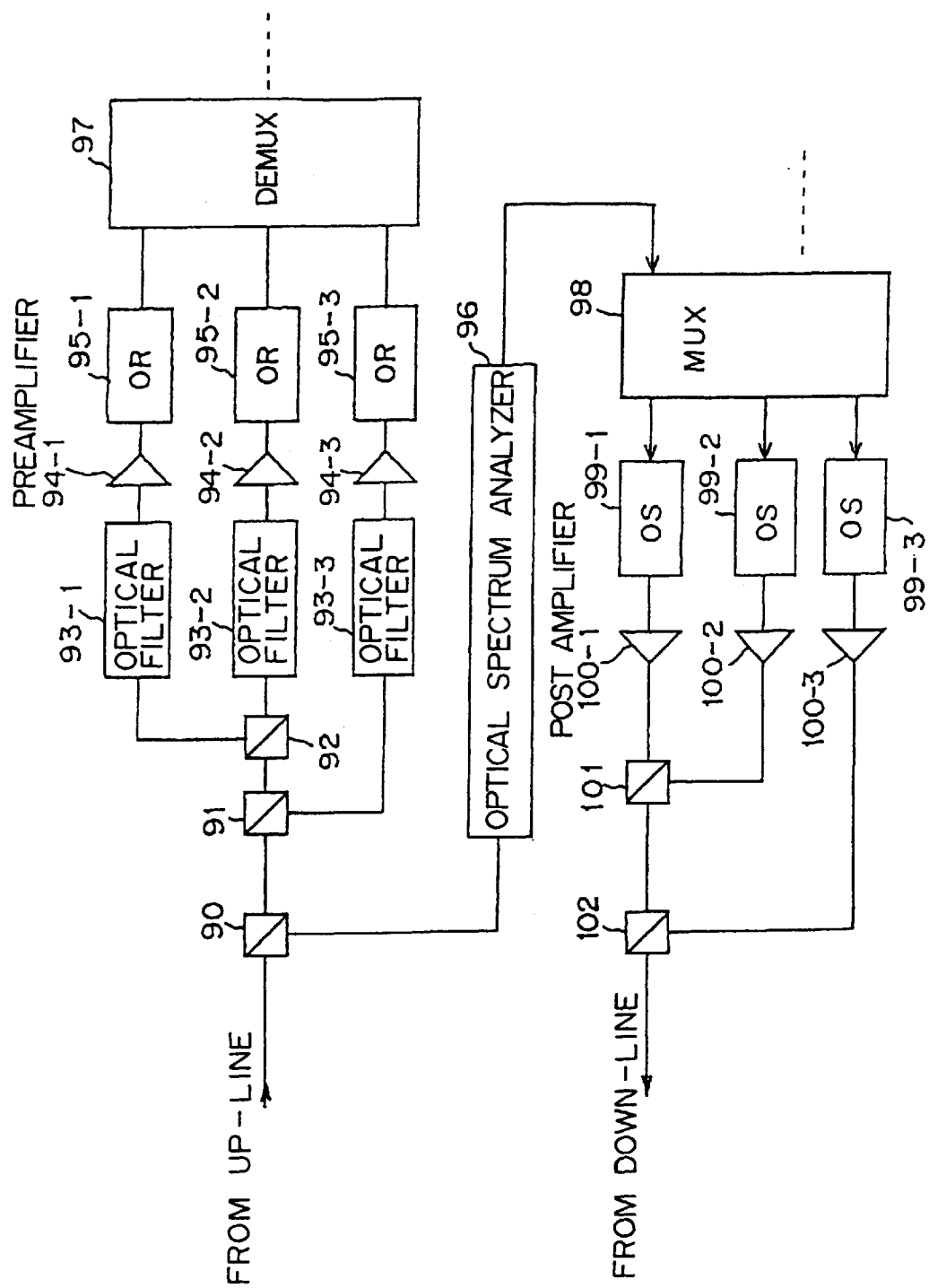
FIG. 12 is a block diagram showing a part of the configuration of the terminal station as a transmitting station and a receiving station.

FIG. 12 is a block diagram showing a part of the terminal station as a transmitting station and a receiving station.

If the optical signal is transmitted from the branching unit through the up-line, then a coupler 90 partly branches the optical signal. The coupler 90 branches the optical signal at the rate of, for example, 10:1. Most optical signals pass through the coupler 90 and is branched by couplers 91 and 92. Each of the branched optical signals is extracted as the signal having each wavelength (a optical signal along each channel) through optical filters 93-1 through 93-3. The optical signal having each wavelength is amplified by preamplifiers 94-1 through 94-3, received by optical receivers 95-1 through 95-3, and converted into an electric signal. A demultiplexer 97 retrieves the information and transmits it to the information processing unit not shown in FIG. 12.

The optical signal branched by the coupler 90 is input to an optical spectrum analyzer 96, and the power level of the optical signal of each wavelength is checked. The reception level difference of the optical signal is retrieved as information. It is written to the information communications format of the optical signal (for example, POH (pass overhead) of SDH/SONET) in the data format generation unit not shown in FIG. 12, and an electric signal is generated in a way that it is applied to the format with other information signals. These processes are performed by a multiplexer 98 shown in FIG. 12. The data signal output from the multiplexer 98 is converted into the optical signals having respective wavelengths by optical transmitting units 99-1 through 99-3 provided for each channel, each optical signal having each wavelength amplified using post amplifiers 100-1 through 100-3, and transmitted. Thus generated optical signal having each wavelength is combined by couplers 101 and 102, and transmitted to a terminal station or a branch station through the down-line.

The terminal station which receives the optical signal not only retrieves the information contained in the optical signal, but also detects the difference in power level of the optical signal having each wavelength using the optical spectrum analyzer 96, and transmits it again as the information inserted into a part of the main signal.

In FIG. 12, the number of times the wavelength of an optical signal is multiplexed is 3, but the number is not limited to 3. Based on FIG. 12, of the three optical receivers 95-1 through 95-3, two optical receivers receive the optical signal from the branch station, and the remaining one optical receiver receives the optical signal which is transmitted from the terminal station, that is, a transmitting station, and passes through the branching unit. Similarly, of the optical transmitting units 99-1 through 99-3, two units transmit the optical signal having a wavelength for transmission to the branch station, and the remaining one unit transmits the optical signal having a wavelength for transmission to the terminal station, that is, the receiving station.

Figure 13:
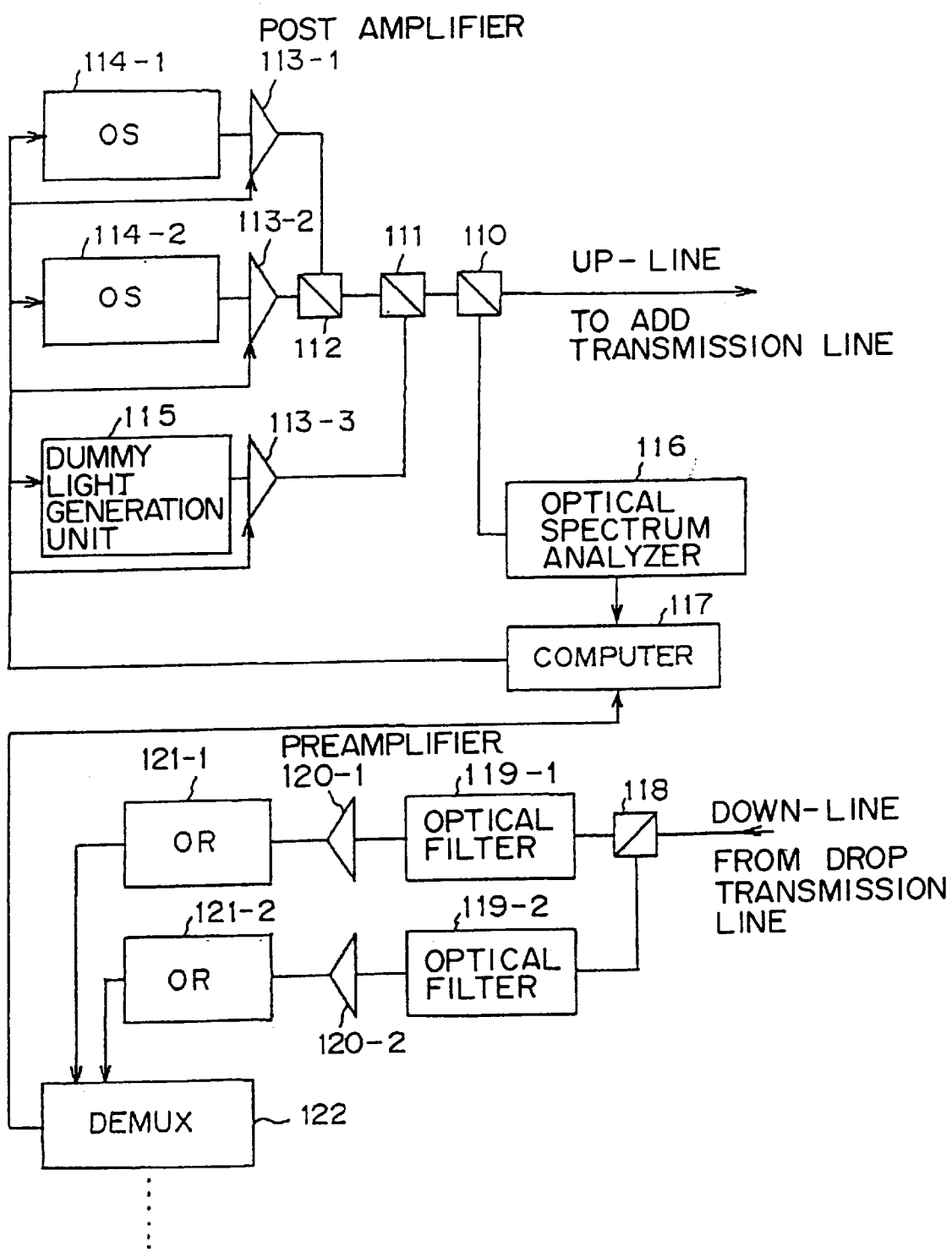
FIG. 13 is a block diagram showing the configuration of a branch station.

FIG. 13 is a block diagram showing a part of the branch station.

Through the down-line, the optical signals having two different wavelengths (not limited to two) is transmitted from the branching unit. A coupler 118 branches the optical signal. Optical filters 119-1 and 119-2 extract an optical signal having each wavelength. The optical signals having respective wavelengths are amplified by preamplifiers 120-1 and 120-2, and converted into electric signals by optical receivers 121-1 and 121-2. Demultiplexer 122 retrieves the information and transmits the information to the information processing unit not shown in FIG. 13.

The demultiplexer 122 extracts the information written in the data transmission format of the optical signal obtained by the optical spectrum analyzer (for example, the reception level difference of an optical signal of each wavelength transmitted from the terminal station in the POH area in the SDH/SONET) in the terminal station, and transmits the information to the computer 117.

The computer 117 sends the data information to be transmitted as a signal to the optical transmitters 114-1 and 114-2, and the optical signal having each wavelength is generated. Furthermore, the branch station comprises a dummy light generation unit 115 to output a dummy light. The optical signal having each wavelength and the dummy light are amplified by post amplifiers 113-1 through 113-3, and combined by couplers 111 and 112 for transmission. The combined optical signal is branched by a coupler 110. The coupler 110 branches a light at the rate of, for example, 10:1, passing most of the light as is, and branching a small part of it. The optical signal branched by the coupler 110 is input to an optical spectrum analyzer 116, and the power level difference of each wavelength of the optical signal output from the branch station is detected.

The detection result of the optical spectrum analyzer 116 is input to the computer 117, and is compared with the information about the reception level difference at the terminal station extracted by the demultiplexer 122. The control signal of the transmission power of the dummy light is transmitted to the post amplifier 113-3. Thus, the reception level difference between the optical signal transmitted from the branch station and the optical signal transmitted to the receiving station without dropping between the terminal station and the branching unit can be monitored. Based on the monitor result, the transmission power level of the dummy light is adjusted. As a result, the difference in power level between the optical signal transmitted from the branch station and combined by the branching unit and the optical signal not dropped can be controlled to be reduced down to almost zero. Therefore, the deterioration in S/N ratio from the power-level-difference can be prevented, and the high system performance can be maintained.

As shown in FIG. 13, the optical signal transmitted to the branch station is carried with two different wavelengths. However, the system configuration is not limited to this application, but the wavelength multiplicity of the optical signal transmitted from the terminal station and the wavelength multiplicity of the optical signal transmitted to the branch station should be appropriately determined as necessary in each designing step.

According to the present invention, the difference in power level between the optical signal having each wavelength transmitted from the branch station in a branching unit and the optical signal of each wavelength not dropped can be compensated when they are combined. The system performance can be prevented from being lowered by the deterioration of the S/N ratio of the lower power level. Therefore, the optical add-drop system capable of maintaining a high system performance can be provided.

What is claimed is:

1. An optical terminal station comprising:
    a signal generator generating an optical transmission signal;
    a dummy light generator generating a dummy light different in wavelength from the optical transmission signal;
    a multiplexer wavelength-multiplexing the dummy light and the optical transmission signal; and
    a level adjustor adjusting a level of the dummy light to control a level of the optical transmission signal at a point downstream of being multiplexed.

2. The optical terminal station according to claim 1, wherein
    said dummy light has a wavelength of a same wavelength band as the optical transmission signal.

3. The optical terminal station according to claim 1, wherein the multiplexed light is amplified with an optical amplifier, and the level adjuster adjusts a level of the dummy light to control a level of the optical transmission signal at an output of the optical amplifier.

4. An optical terminal station according to claim 1, wherein the level adjustor adjusts the level of the dummy light in accordance with a characteristic of the optical transmission signal detected downstream of being multiplexed.

5. An optical terminal station according to claim 1, wherein the level adjustor adjusts the level of the dummy light in accordance with a characteristic of the optical transmission signal detected at a receiver downstream of being multiplexed.

6. A method comprising:
    multiplexing an optical transmission signal and a dummy light together into a multiplexed light, the dummy light being different in wavelength from the optical transmission signal;
    amplifying the multiplexed light with an optical amplifier; and
    adjusting a level of the dummy light to control a level of the optical transmission signal at an output of the optical amplifier.

7. The method according to claim 6, wherein
    said dummy light has a wavelength of a same wavelength band as the optical transmission signal.

8. A method according to claim 6, wherein said adjusting adjusts the level of the dummy light in accordance with a characteristic of the optical transmission signal detected downstream of being multiplexed.

9. A method according to claim 6, wherein said adjusting adjusts the level of the dummy light in accordance with a characteristic of the optical transmission signal detected at a receiver downstream of being multiplexed.

10. An optical terminal station comprising:
    a signal generator generating an optical transmission signal;
    a dummy light generator generating a dummy light different in wavelength from the optical transmission signal;
    a multiplexer wavelength-multiplexing the dummy light and the optical transmission signal; and
    means for adjusting a level of the dummy light to control a level of the optical transmission signal at a point downstream of being multiplexed.

11. The optical terminal station according to claim 10, wherein said dummy light has a wavelength of a same wavelength band as the optical transmission signal.

12. The optical terminal station according to claim 10, wherein the multiplexed light is amplified with an optical amplifier, and the means for adjusting adjusts the level of the dummy light to control a level of the optical transmission signal at an output of the optical amplifier.

13. An optical terminal station according to claim 10, wherein said means for adjusting adjusts the level of the dummy light in accordance with a characteristic of the optical transmission signal detected downstream of being multiplexed.

14. An optical terminal station according to claim 10, wherein said means for adjusting adjusts the level of the dummy light in accordance with a characteristic of the optical transmission signal detected at a receiver downstream of being multiplexed.

15. An apparatus comprising:
    means for multiplexing an optical transmission signal and a dummy light together into a multiplexed light, the dummy light being different in wavelength from the optical transmission signal;
    an optical amplifier amplifying the multiplexed light; and
    means for adjusting a level of the dummy light to control a level of the optical transmission signal at an output of the optical amplifier.

16. The apparatus according to claim 15, wherein said dummy light has a wavelength of a same wavelength band as the optical transmission signal.

17. An apparatus according to claim 15, wherein said means for adjusting adjusts the level of the dummy light in accordance with a characteristic of the optical transmission signal detected downstream of being multiplexed.

18. An apparatus according to claim 15, wherein said means for adjusting adjusts the level of the dummy light in accordance with a characteristic of the optical transmission signal detected at a receiver downstream of being multiplexed.

19. An optical terminal station comprising:
    a signal generator generating an optical transmission signal;
    a dummy light generator generating a dummy light different in wavelength from the optical transmission signal;
    a multiplexer wavelength-multiplexing the dummy light and the optical transmission signal together into a multiplexed light, the multiplexed light being amplified by an optical amplifier; and
    a level adjustor adjusting a power level of the dummy light to control a power level of the optical transmission signal at an output of the optical amplifier.

20. An optical terminal station according to claim 19, wherein the level adjustor controls the dummy light generator to control the power level of the dummy light.

21. An optical terminal station according to claim 19, wherein the level adjustor adjusts the power level of the dummy light in accordance with a power level of the optical transmission signal detected downstream of the amplifier.

22. An optical terminal station according to claim 19, wherein the level adjustor adjusts the level of the dummy light in accordance with a characteristic of the optical transmission signal detected at a receiver downstream of the amplifier.

23. An optical terminal station comprising:

a signal generator generating an optical transmission signal;

a dummy light generator generating a dummy light different in wavelength from the optical transmission signal;

a multiplexer wavelength-multiplexing the dummy light and the optical transmission signal together into a multiplexed light, the multiplexed light being amplified by an optical amplifier; and a controller controlling the dummy light generator to adjust a power level of the dummy light, to thereby control a power level of the optical transmission signal at an output of the optical amplifier.

24. An optical terminal station according to claim 23, wherein the controller controls the dummy light in accordance with a characteristic of the optical transmission signal detected downstream of the optical amplifier.

25. An optical terminal station according to claim 23, wherein the controller controls the dummy light in accordance with a characteristic of the optical transmission signal detected at a receiver downstream of the optical amplifier.

26. An optical terminal station comprising:

a signal generator generating an optical transmission signal;

a dummy light generator generating a dummy light different in wavelength from the optical transmission signal;

a multiplexer wavelength-multiplexing the dummy light and the optical transmission signal together into a multiplexed light, the multiplexed light being amplified by an optical amplifier; and means for controlling the dummy light generator to adjust a power level of the dummy light, to thereby control a power level of the optical transmission signal at an output of the optical amplifier.

27. An optical terminal station according to claim 26, wherein the controller controls the dummy light generator in accordance with a characteristic of the optical transmission signal detected downstream of the optical amplifier.

28. An optical terminal station according to claim 26, wherein the controller controls the dummy light generator in accordance with a characteristic of the optical transmission signal detected at a receiver downstream of the optical amplifier.

29. An apparatus comprising:

a signal generator generating an optical transmission signal;

a dummy light generator generating a dummy light different in wavelength from the optical transmission signal;

a multiplexer wavelength-multiplexing the dummy light and the optical transmission signal together into a multiplexed light;

an optical amplifier amplifying the multiplexed light; and a controller controlling the dummy light generator to adjust a power level of the dummy light, to control a power level of the optical transmission signal at an output of the optical amplifier.

30. An apparatus according to claim 25, wherein the controller controls the dummy light generator in accordance with a characteristic of the optical transmission signal detected downstream of the optical amplifier.

31. An apparatus according to claim 29, wherein the controller controls the dummy light generator in accordance with a characteristic of the optical transmission signal detected at a receiver downstream of being optical amplifier.

32. An apparatus comprising:

a signal generator generating an optical transmission signal;

a dummy light generator generating a dummy light different in wavelength from the optical transmission signal;

a multiplexer wavelength-multiplexing the dummy light and the optical transmission signal together into a multiplexed light;

an optical amplifier amplifying the multiplexed light;

a receiver downstream of the optical amplifier and receiving the optical transmission signal from the multiplexed light; and a controller controlling the dummy light generator in accordance with a power level of the optical transmission signal as received by the receiver, to control a power level of the optical transmission signal at an output of the optical amplifier.

33. An apparatus comprising:

a signal generator generating an optical transmission signal;

a dummy light generator generating a dummy light different in wavelength from the optical transmission signal;

a multiplexer wavelength-multiplexing the dummy light and the optical transmission signal together into a multiplexed light;

an optical amplifier amplifying the multiplexed light;

a receiver downstream of the optical amplifier and receiving the optical transmission signal from the multiplexed light; and means for controlling the dummy light generator in accordance with a power level of the optical transmission signal as received by the receiver, to control a power level of the optical transmission signal at an output of the optical amplifier.

* * * * *